June 10, 1930.  J. GARTHE  1,763,463
DADO CUTTER
Filed April 22, 1929
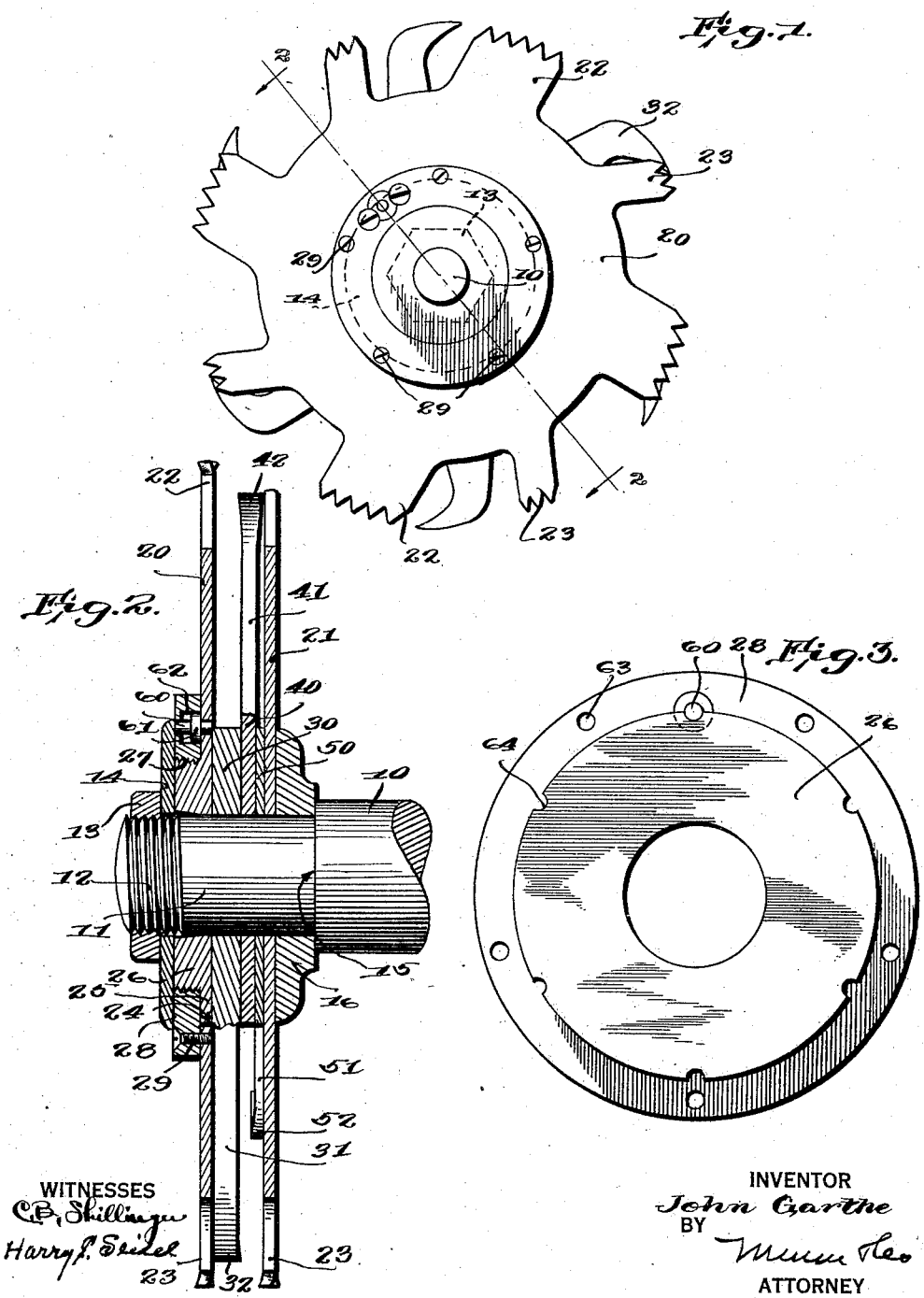
INVENTOR
John Garthe
BY
ATTORNEY Patented June 10, 1930

1,763,463

UNITED STATES PATENT OFFICE

JOHN GARTHE, OF PONTIAC, MICHIGAN

DADO CUTTER

Application filed April 22, 1929. Serial No. 357,296.

This invention relates to a dado cutter.

An object of the invention is the provision of a device for cutting grooves which is simply constructed and contains a minimum of parts for performing the work and for adjustably positioning the cutters or saws.

A further object of the invention is the provision of a dado-cutter by which a plurality of grooves may be formed of various dimensions through adjustable means for controlling the position of the cutters.

This invention will be best understood from a consideration of the following detailed description, in view of the accompanying drawings forming a part of the specification; nevertheless it is to be understood that the invention is not confined to the disclosure, being susceptible of such changes and modifications which shall define no material departure from the salient features of the invention as expressed in the appended claims.

In the drawings:

Figure 1 is a side view in elevation of a dado-cutter constructed in accordance with the principles of my invention, Figure 2 is a section taken along the line 2—2 of Figure 1, and Figure 3 is a view in elevation of the adjustable means for positioning the cutters.

Referring more particularly to the drawings, 10 designates a shaft having a reduced portion 11 which is threaded at 12. The threaded portion is adapted to receive a nut 13 and a washer 14. The reduction of the shafts provides a shoulder 15, against which one face of a washer 16 is adapted to seat.

A pair of circular saws 20 and 21 are mounted on the reduced portion 11 of the shaft and are provided with pairs of sets of teeth 22 and 23. The group of teeth 23 are narrower than the group 22 and are inclined at a less angle to the radius passing through said group and the inclination of the angle of the group 22 through its respective radius.

The teeth of the various groups are similarly arranged and are constructed in the same manner as the ordinary rip saw. The saw 20 has its central portion cut away as shown at 24 to receive an outer flange 25 of an adjusting washer 26. The washer is threaded at 27 upon which is screwed a nut 28 lying in flat contact with the outer face of the circular saw 20 and secured to said saw by means of bolts 29.

A circular member or disc 30 is received by the portion 11 of the shaft and has radially disposed arms 31 having an expanded cutting edge 32.

A second circular plate 40 is received by the reduced portion 11 of the shaft 10 and likewise has arms 41 projecting radially therefrom and provided with an expanded cutting edge 42. It will be noted that the thickness of the plate 40 is less than the plate 30. A third plate 50 has radially disposed arms 51 provided with cutting edges 52. These plates are clamped together by means of the nut 13 and the shoulder 15 on the shaft 10 and against the washer 16.

A sliding pin 60 has a cuff 61 mounted in a pocket or chamber 62 in the nut 28. The pin is adapted to project into a notch in saw 20 and into one of the complementary notches 64 formed in the flange 25 of the washer 26.

By releasing the pin 60 and rotating the nut 28 relative to the washer 26 the saw will be moved towards or away from the disc 40 and thereby increasing the width of the cut to be made. It will be appreciated that if desired any number of the cutting elements may be removed from the reduced portion 11 of the shaft 10. It will be noted that the width of the member 50 is less than the width of the members 30 and 40 and that the member 40 is of less width than the member 30.

The pin 60 may be employed as an index to the unscrewing of the nut 28 from the washer 26 and the notches 64 which receive the pin 60 are so spaced from each other that extremely small fractions of an inch of the adjustment of the saw 20 are accomplished by varying the relative positions between the washer 26 and the nut 28. Any adjustment of the saw 20 axially of the shaft 10 does not prevent the washer 26 from clamping the remaining blades against the shoulders 15 when the nut 13 is drawn up tight against the washer 14.

I claim:

1. A dado-cutter comprising a shaft having a shoulder, a pair of spaced circular saws on the shaft, a plurality of discs mounted between the saws and provided with cutters, a washer having a projecting annular flange, one of the circular saws having an opening to receive the flange, said washer having an externally threaded reduced portion, a nut threaded on to said reduced portion and connected to the saw, the flange having a plurality of notches and a pin carried by the nut and engageable with the notches for locking the nut to the washer.

2. A dado-cutter comprising a shaft having a shoulder, a pair of spaced circular saws on the shaft, a plurality of discs mounted between the saws and provided with cutters, a washer associated with one of the saws, a nut threaded on the washer and connected to the last-mentioned saw, and means for locking the washer to the last mentioned saw and providing for an angular rotative adjustment of the washer relative to the saw, while providing for an adjustment of the saw on the washer axially of the shaft.

3. A dado-cutter comprising a shaft having a shoulder, a pair of spaced circular saws on the shaft, a plurality of discs mounted between the saws and provided with cutters, one of the saws having an axial opening, a washer received within said opening, said washer having a threaded reduced portion, a nut screwed on the threaded portion and connected to the saw, co-operating means on the washer and last mentioned saw, and means engaging the co-operating means for locking the saw and washer together not providing for plurality of angular positions between the washer and the saw while providing an adjustment of the saw on the washer axially of the shaft.

JOHN GARTHE.